(12) United States Patent
Springer

(10) Patent No.: US 6,302,425 B1
(45) Date of Patent: Oct. 16, 2001

(54) TRAILER TONGUE EXTENSION APPARATUS

(75) Inventor: William O. Springer, Fargo, ND (US)

(73) Assignee: Springer Family Patents Limited Partnership, Fargo, ND (US)

(*) Notice: Subject to any disclaimer, the term of this patent is extended or adjusted under 35 U.S.C. 154(b) by 0 days.

(21) Appl. No.: 09/416,726

(22) Filed: Oct. 13, 1999

Related U.S. Application Data

(60) Provisional application No. 60/105,573, filed on Oct. 26, 1998.

(51) Int. Cl.[7] ....................................................... B60P 3/10
(52) U.S. Cl. ..................................... 280/491.3; 280/491.1; 280/414.1; 280/482; 114/344
(58) Field of Search .......................... 280/491.1, 491.3, 280/491.4, 491.5, 414.1, 414.2, 414.3, 482, 415.1, 416.1; 114/344

(56) References Cited

U.S. PATENT DOCUMENTS

| | | | |
|---|---|---|---|
| 3,155,399 | * 11/1964 | Fetzko | 280/491.5 |
| 3,645,560 | 2/1972 | Steele | 280/482 |
| 3,904,225 | 9/1975 | George et al. | 280/478.1 |
| 4,073,508 | 2/1978 | George et al. | 280/478.1 |
| 4,169,611 | 10/1979 | Smith et al. | 280/482 |
| 4,202,562 | 5/1980 | Sorenson | 280/482 |
| 4,398,742 | * 8/1983 | Sanders | 280/482 |
| 4,407,519 | * 10/1983 | Heyser | 280/414.1 |
| 4,592,694 | * 6/1986 | Johnson | 280/414.1 |
| 4,714,265 | * 12/1987 | Franklin | 280/491.4 |
| 4,726,601 | * 2/1988 | Stevens | 280/414.1 |
| 4,913,451 | 4/1990 | Woodall | 280/478.1 |
| 5,114,168 | * 5/1992 | Kehl | 280/414.1 |
| 5,292,145 | * 3/1994 | Ostrand | 280/414.1 |
| 5,503,423 | * 4/1996 | Roberts et al. | 280/491.3 |
| 5,520,494 | * 5/1996 | Hughes | 280/414.1 |
| 5,727,805 | 3/1998 | La Roque | 280/478.1 |
| 5,890,617 | * 4/1999 | Rowland et al. | 280/491.3 |

FOREIGN PATENT DOCUMENTS

3235579 A1 * 3/1984 (DE).

* cited by examiner

Primary Examiner—Kevin Hurley
Assistant Examiner—Ruth Ilan
(74) Attorney, Agent, or Firm—Merchant & Gould P.C.

(57) ABSTRACT

A trailer with an extension member pivotally mounts to a hinge attached to the tongue or frame of the trailer. Front and rear retainers bolt and clamp onto the tongue and frame. The extension member is retained by the forward retainer and extends substantially parallel to the trailer tongue and beyond the trailer tongue. The forward end of the extension member includes a receiver element for mounting to the hitch of a towing vehicle and for extending the trailer further behind the towing vehicle. The extension member pivotally swings rearward to the storage position where it is retained for travel.

19 Claims, 5 Drawing Sheets

TRAILER TONGUE EXTENSION APPARATUS

This application claims benefit of Provisional No. 60/105,573 Oct. 26, 1998.

BACKGROUND

1. Field of the Invention

The present invention relates to a trailer tongue extension apparatus and in particular, to a trailer tongue extension mountable and storable on the trailer when not in use.

2. Prior Art

Trailers are used for a variety of purposes for towing boats, snowmobiles, motorcycles, and other articles. Many common trailers use a ball hitch with a receiving device on the trailer tongue mounting to a ball on the towing vehicle. The trailers are normally configured for easily towing behind a vehicle and typically perform satisfactorily with few problems.

Trailers for towing boats have additional design criteria and sometimes face additional problems. Boat trailers must be backed into water for launching and retrieving the boat. A common problem encountered by boaters is the depth of the water at the launch ramp may not be adequate relative to the depth needed to easily launch and retrieve the boat. Boats must be pushed a sufficient distance into the body of water to be able to float from the trailer, as they cannot be easily pushed off the trailer due to their weight. In some instances, the bottom of the body of water does not slope steeply enough to allow the vehicle to be backed up so that the boat may be easily launched, as the rear of the towing vehicle may be wet and in the water. The same problem also occurs when trying to retrieve the boat from the water. If the trailer is not backed a sufficient depth into the body of water, it may be difficult or impossible to pull the boat properly onto the trailer.

By making the trailer tongue longer, it is possible to extend the boat further into the body of water to a greater depth, thereby making launching and retrieving easier. However, for normal transportation and storage, having an extended trailer causes other problems. An extended trailer may prevent finding a suitable parking place while using the boat or make maneuvering the vehicle and trailer difficult in a parking lot or boat launch. Turning with a long trailer requires more room, as does storing the trailer.

To address this problem, various types of extensions have been made that lengthen the distance between the towing vehicle and the boat. Although these extension devices may provide a greater distance between the towing vehicle and the framework of the trailer, heretofore each device has its own shortcomings. Many extension devices mount directly to the towing vehicle rather than the trailer. By mounting to the vehicle, the extension is often difficult to mount and is not easily removed. Therefore, even when retracted and not in use, the added weight and decreased aesthetics of the extension device remain.

Other extender devices have required major modifications of the trailer or extensions have required modifications to the trailer hitch and have not been removable. These devices also have limited extension and cannot be retrofitted to existing trailers. These devices have been expensive and complicated, requiring special tools to operate and maintain.

It can be appreciated that a new and improved trailer tongue extension is needed that mounts to the trailer rather than the towing vehicle. Such a device should be easily mountable and demountable and should be easily retrofitted to existing trailers without modification or reconfiguration of the existing hitch system. In addition, such a system should be easily mounted and stored on the trailer and out of the way when not in use, allowing the original hitch system to be utilized for normal highway use. The present invention addresses these as well as other problems associated with trailer extensions.

SUMMARY OF THE INVENTION

The present invention is directed to an extension apparatus and in particular. to a tongue extension apparatus for a trailer.

Trailers, such as boat trailers, typically have a frame with a tongue extending forward from the frame. A portion of the hitch is at the forward end of the tongue and configured for mounting to the complementary portion of the hitch on the towing vehicle. To facilitate extension of the trailer further into the water such as may be necessary for launching and retrieving boats at shallow boat launches, an extension device mounts to the tongue and frame of the trailer to position the boat in deeper water. An extender member pivotally mounts to a hinge at a rear portion of the tongue or front portion of the frame. Retainers are mounted to a forward portion of the tongue and at a position behind the hinge. The extension member includes a receiver element for mounting to the complementary hitch member of the towing vehicle. The extension member is pivotally mounted about the hinge and extends substantially parallel to and beyond the tongue in a use position. A forward retainer provides for maintaining the extension member at the use position. A removable retainer pin allows for freely pivoting the extension member rearward to the storage position from the forward position.

A rear retainer is positioned on the frame to receive the extension member in the storage position. The rear retainer includes a removable pin that can be positioned for retaining the extension member in the rearward extending position. When extended rearward, the extension member extends in front of the wheels of the trailer, yet does not extend laterally outward so that the trailer does not take up additional space during towing or for storage.

The hinge and retainers either clamp or bolt to the trailer so that the extension device may be retrofitted to existing stock trailers. The extension member may come in varying lengths to accommodate various trailer designs and specifications and to allow for the needed extension depending on the type of boat and the depth of the body of water into which the boat is being launched.

These features of novelty and various other advantages which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

Referring now to the drawings, wherein like reference numerals and letters indicate corresponding elements throughout the several views.

DETAILED DESCRIPTION OF THE PREFERRED EMBODIMENT

Figure 1:
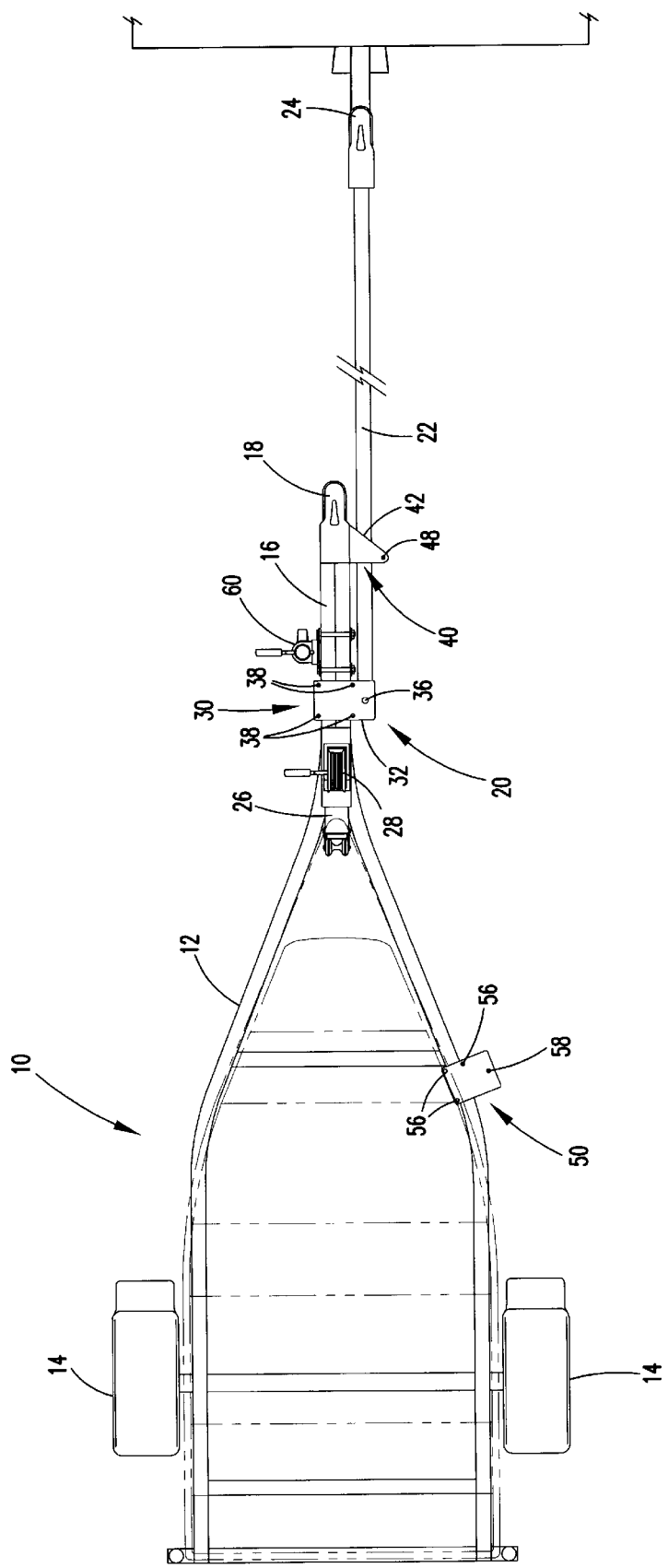
FIG. 1 shows a top plan view of a trailer and trailer tongue extender according to the principles of the present invention, with a boat shown in phantom and the trailer attached to a towing vehicle in a use position.

Referring now to the drawings, and in particular to FIG. 1, there is shown a trailer 10, shown here as a boat trailer, connected to a towing vehicle. The trailer 10 typically includes a frame 12 receiving a boat (shown in phantom) for transport and allows the boat to be launched and retrieved from the rear of the trailer 10. The frame 12 mounts on wheels 14 with a tongue 16 extending forward from the frame 12. The frame 12 typically includes a rectangular section with a "Y" shaped portion extending forward with the trailer tongue 16 forming the extended portion of the "Y". The frame 12 may have a front support 26 with rollers and a winch 28. To ease storage and maneuvering when not coupled to the towing vehicle, a caster wheel 60 is often added to the trailer 10. The tongue 16 typically includes a ball receiver 18 portion of a ball hitch that mounts to the ball of the towing vehicle. It can be appreciated that although a ball type hitch is shown, other hitches may also be used. The ball receiver 18 is generally fixed at the extreme front end of the tongue 16. Stock trailers 10 do not provide any adjustment for varying the distance behind the vehicle at which the boat is positioned. Without extension, for shallow bodies of water, it may be difficult or impossible to position the boat to sufficient depth in the body of water while keeping the towing vehicle in a position where it will not be damaged by entry into the water.

To extend the distance of the boat or other object relative to the towing vehicle and to move the frame 12 and rear wheels 14 of the trailer further from the towing vehicle, an extender 20 is mounted to the trailer 10. The extender 20 includes an extension member 22 having a second ball receiver 24 configured for mounting to the ball or other complementary portion on the towing vehicle. The extension member 22 is typically formed of a 3×3 rectangular tube or similar structure. The length may be varied to accommodate the needed extension distance and the parameters allowed by the trailer, but typically will add 4, 6 or 8 feet to the length of the tongue. Although the extender 20 is mountable on either side of the tongue 16, it is preferably mounted on the right side so that if it were inadvertently left unrestrained, it would not swing out into the usual traffic side.

Figure 5:
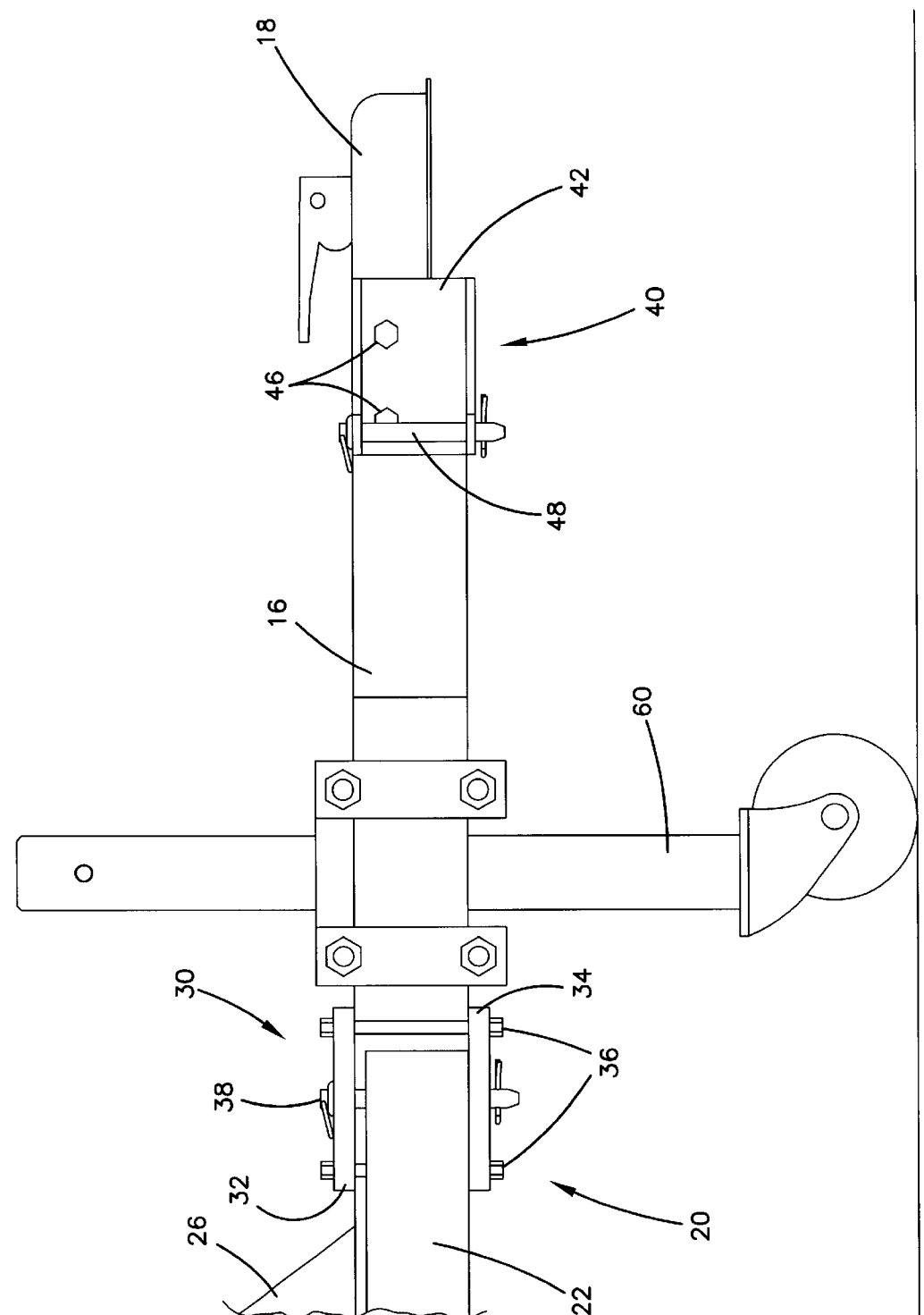
FIG. 5 shows a side detail elevational view of the tongue hinge and forward retainer for the trailer shown in FIG. 1.

The extension member 22 extends horizontally and pivotally mounts on a hinge 30 having a top plate 32 and bottom plate 34 connected by retainer bolts 38, as shown most clearly in FIG. 5. The hinge 20 mounts to the tongue 16 or to the frame 12 near the intersection with the tongue 16. The hinge 30 includes a vertical pivot pin 36 about which the extension member 22 rotates. With the pivot pin 36 spaced from the frame 12 and the tongue 16, the extension member 22 swings through a range of motion from a position substantially parallel with the tongue 16 to a rearward extending position alongside the frame 12.

In the use position shown in FIG. 1, the extension member 22 is held in place by a retainer 40. The retainer includes a C-channel type bracket 42 opening away from the tongue 16. Stock mounting bolts 46 for the ball receiver 18 are used and extend through the side of the bracket 42 mount on the tongue 16 forward of the hinge 30. The retainer 40 includes a removable retainer pin 48 extending through the top and bottom horizontal portions of the bracket 42. The retainer pin 48 is configured to extend outside of the extension member 22 when it is moved to its most forward position. With this arrangement, the extension member 22 is held between the retainer pin 48 and the tongue 16 extending substantially forward parallel to the tongue 16. The retainer pin 48 typically includes a cotter pin or other retention device to ensure that the retainer pin 48 does not fall from the forward retainer 40.

Figure 2:
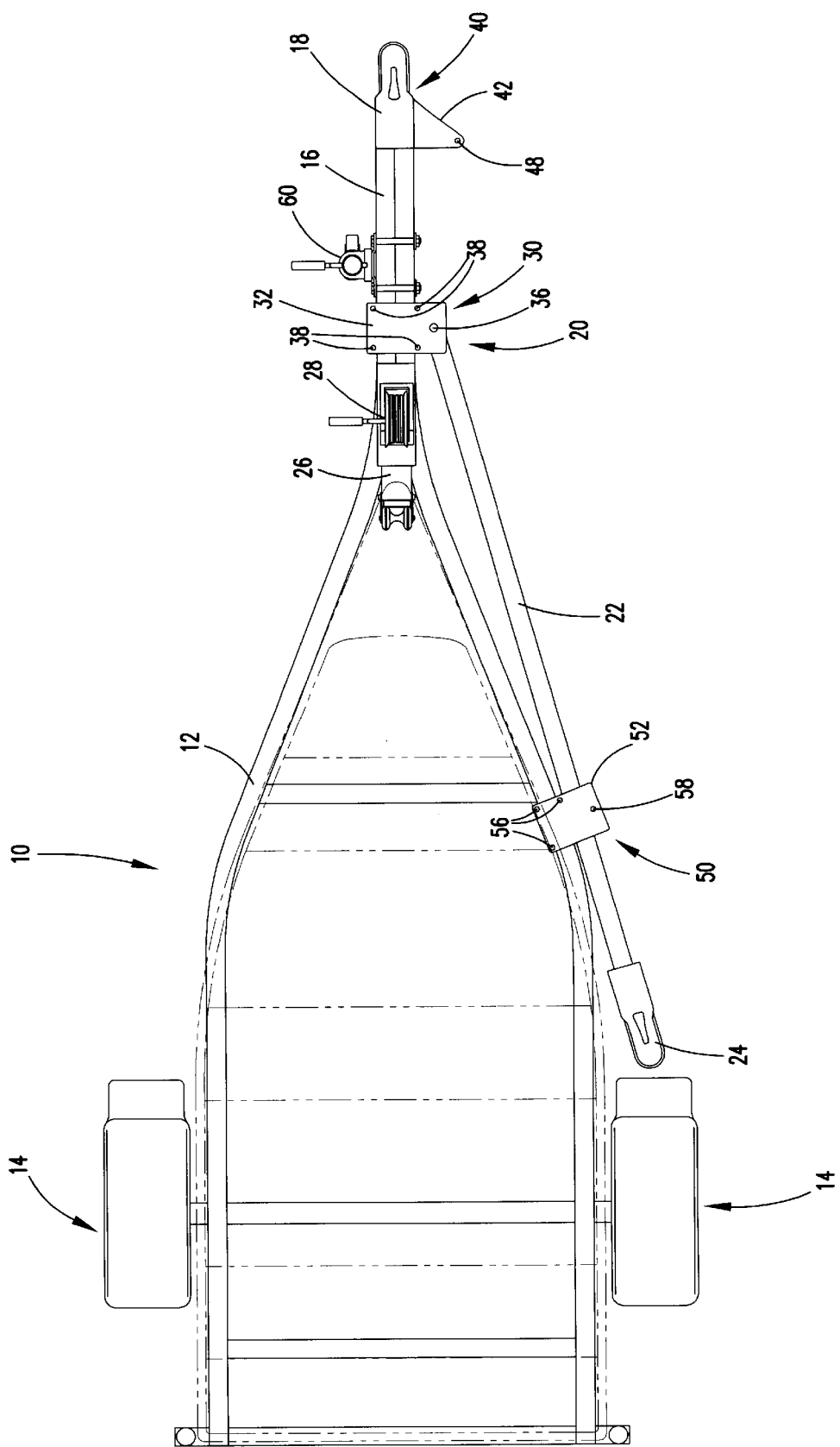
FIG. 2 shows a top plan view of the trailer and trailer extender shown in FIG. 1, with the extender in a storage position.
Figure 3:
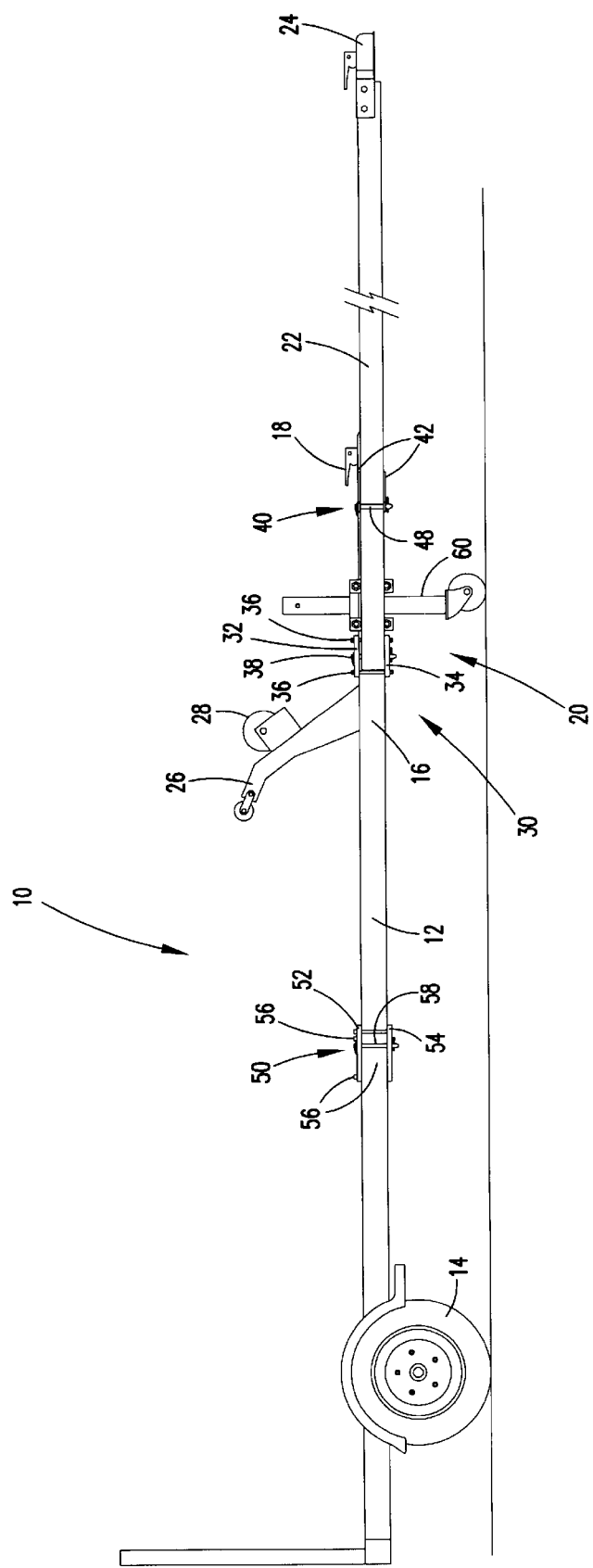
FIG. 3 shows a side elevational view of the trailer and extender tongue shown in FIG. 1.
Figure 4:
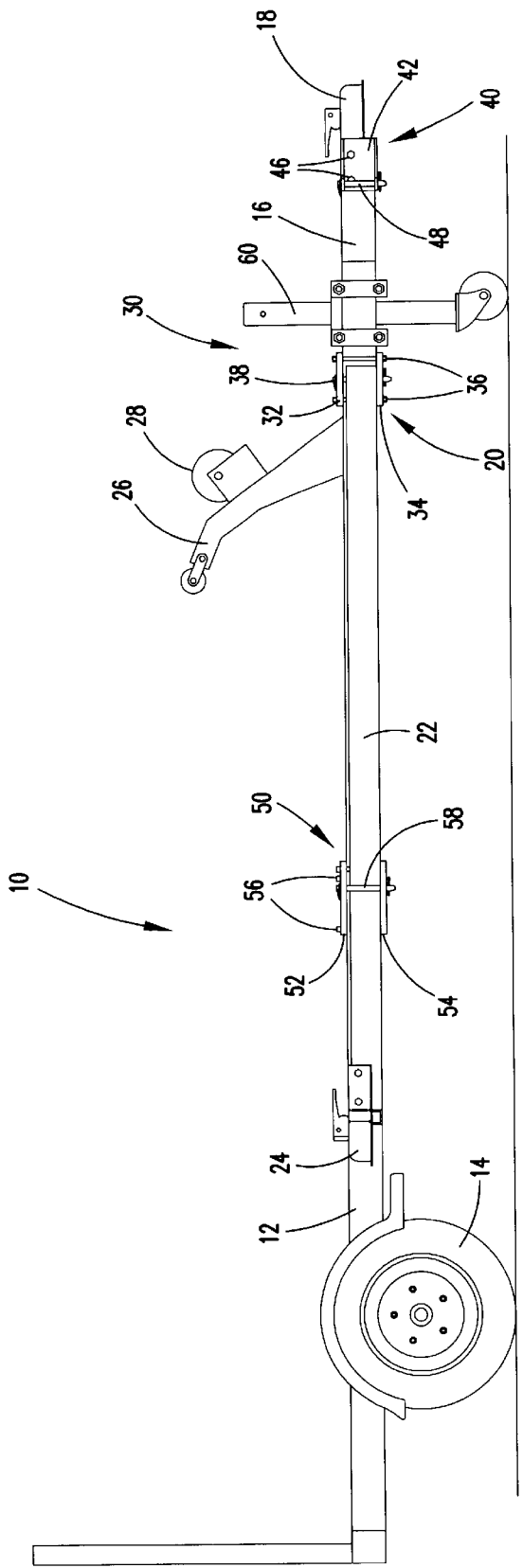
FIG. 4 shows a side elevational view of the trailer and tongue extender shown in FIG. 1, with the extender in a storage position.

In a similar manner, a rear storage retainer 50 mounts on the frame 12 rearwardly from the hinge 30. The storage retainer 50 includes a top plate 52 and bottom plate 54 that extend on either side of the frame 12. The top and bottom plates 52 and 54 are joined by retainer bolts 56 to clamp the plates 52 and 54 and secure the storage retainer to the frame 12, as shown in FIGS. 1 and 3. A retainer pin 58 extends through the top and bottom plates and may include a cotter pin for holding the retainer pin 58 in position. For storage, the extension member 22 is rotated backward so that it is held between the frame 12 and the retainer pin 16 and intermediate the top and bottom plates is 52 and 54 of the rear storage retainer 50. As shown in FIGS. 2 and 4, in a storage position, the extension member 22 extends rearwardly towards the edge of the frame 12. The extension member 22 is positioned before the wheels 14, yet does not extend laterally outward beyond the wheels 14 so that it does not cause any hazard during travel or when parked.

The extender 20 is quite useful in increasing the distance between the trailer wheels and therefor the boat or other vehicle towed and the towing vehicle and improving boat launching and retrieving. However, the extender 20 is meant for maneuvering in parking lots and boat launches and is not meant for normal highway use.

To mount the extender 20, the top and bottom plates 32 and 34, and 52 and 54 are all placed on either side of the tongue 16 or frame 12 and the retainer bolts 38, and 56 are extended through the plates and connected to clamp the plates against the frame 12 or tongue 16. The mounting bolts 46 are passed through the mounting holes in the side of the C-channel to attach the bracket 42 to the tongue 16. When the hinge 30, retainer 40, and storage retainer 50 are placed on the frame 12 and tongue 16, they must be positioned so that the extension member 22 extends substantially parallel to the tongue 16 in the forward use position and is sufficiently out of the way so that it is not extending laterally beyond the side of the wheels 14 in the storage position, as shown in FIG. 2. When the hinge 30, retainer 40, and storage retainer 50 are positioned in an acceptable manner, the various retainer bolts may be tightened. The extension member 22 is mounted horizontally to the hinge with the vertical pivot pin 36. The pivot pin 36 may be a bolt type member or a pin type member that extends through corresponding holes of the extension member 22. If the trailer frame 12 and/or tongue 16 is thicker than the extension member 22, spacers may be attached to the retainers 40, 50 and/or hinge 30 or the plates may be bent to provide a better fit.

Under normal towing conditions, the extender 20 will have the extension member 22 extending rearward and held by the storage retainer 50 as shown in FIGS. 2 and 4. To extend the length of the tongue 16, the retainer pin 58 is removed so that the extension member 22 may pivot freely. The trailer 10 must be unhitched from the towing vehicle so that there is sufficient distance to pivot the extension member 22 forward as it will extend in front of the trailer hitch ball receiver 18. The pin 48 is removed from the retainer bracket 42 and the extender 20 is positioned with extension member 22 extending forward well beyond the tongue 16, as shown in FIGS. 1 and 3. The vehicle is then positioned so that the extender ball receiver 24 may be attached to the ball of the towing vehicle. The trailer 10 is extended for backing an increased distance into the water.

Although the hinge 30, retainer 40, and storage retainer 50 are shown as being bolted to the frame 12 and tongue 16 of the trailer 10. It can also be appreciated that the various elements may be more permanently affixed as by welding or other means. The present invention allows for mounting around a caster wheel 60 without interference or repositioning. The present invention also allows for easily retrofitting existing trailers and can be adapted to various sizes and shapes. The bolt-on construction shown does not require any drilling of holes or other modifications to the existing trailer 10 and simply allows for easy mounting and removal of the extender 20 to a boat type trailer.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An extension apparatus for a trailer, the trailer having a frame, a tongue and a trailer hitch, the apparatus comprising:
    an extension member having a hitch, wherein the extension member is pivotally mountable on the trailer and rotatable in a horizontal plane between a first position and a second position;
    a first retainer adapted for mounting the extension member to the trailer in the first position to extend beyond the trailer hitch; and,
    a second retainer comprising a bracket adapted to be attached to the frame and adapted for mounting the extension member to the trailer in the second position wherein the extension member extends behind the trailer hitch.

2. An extension apparatus according to claim 1, wherein the extension member is adapted for mounting to an exterior of the tongue.

3. An extension apparatus according to claim 1, wherein the extension member is adapted for removably mounting to the trailer.

4. An extension apparatus according to claim 1, wherein the extension member is adapted for extending substantially rearwardly from the tongue in the second position.

5. An extension apparatus according to claim 1, wherein the second retainer is adapted for clamping to the frame.

6. An extension apparatus according to claim 1, wherein the extension member includes a hinge adapted for clamping to the frame.

7. An extension apparatus according to claim 1, wherein the second retainer device is adapted to mount to a side of the frame and is retained against an outer side of the frame.

8. An extender apparatus according to claim 1, wherein the first retainer includes a removable vertical pin and wherein the extension member is retained between the pin and the tongue in the first position.

9. A trailer, comprising:
    a frame having interconnected frame members defining a substantially horizontal plane;
    a tongue extending from the frame;
    a trailer hitch;
    at least two wheels rear of the tongue;
    an extension member rotatably mounted to the tongue to rotate in a horizontal plane and having a hitch;
    a first retainer for mounting the extension member to the tongue in a first position to extend beyond the trailer hitch in the plane of the frame; and
    a second retainer attached to the frame for mounting the extension member to the tongue in a second rearwardly extending position against a side of the frame in the plane of the frame.

10. A trailer according to claim 9, wherein the extension member mounts to an exterior of the tongue.

11. A trailer according to claim 9, wherein the extension member removably mounts to the trailer.

12. A trailer according to claim 9, wherein the extension member extends substantially rearwardly from the tongue in the second position.

13. A trailer according to claim 9, wherein the extension member is forward of the wheels in the first and second positions.

14. A trailer according to claim 9, wherein the frame includes a fork having two frame members diverging from one another rear of the tongue, and wherein the second retainer mounts to a side of one of the diverging members.

15. A trailer according to claim 14, wherein the extension member is forward of the wheels in the first position and the second position.

16. A removable extension system adapted for mounting to a trailer, the trailer having a frame defining a substantially horizontal plane and mounted on wheels, and a tongue extending from a front portion of the frame, the extension system comprising:
    a hinge assembly adapted for mounting to the tongue;
    a first retainer device adapted for mounting to the tongue forward of the hinge assembly;
    a second retainer device adapted for mounting to the frame forward of the wheels;
    an extension member rotatably mounted on the hinge assembly and adapted for rotating between a first position extending forward from the hinge assembly and a second position extending rearward from the hinge assembly.

17. A system according to claim 16, wherein the extension member is adapted to rotate in the horizontal plane.

18. A system according to claim 16, wherein the entire extension member is forward of the wheels in the first and second positions.

19. A system according to claim 16, wherein the second retainer device is adapted to mount to an outer side of the frame.

* * * * *